Figure 1:
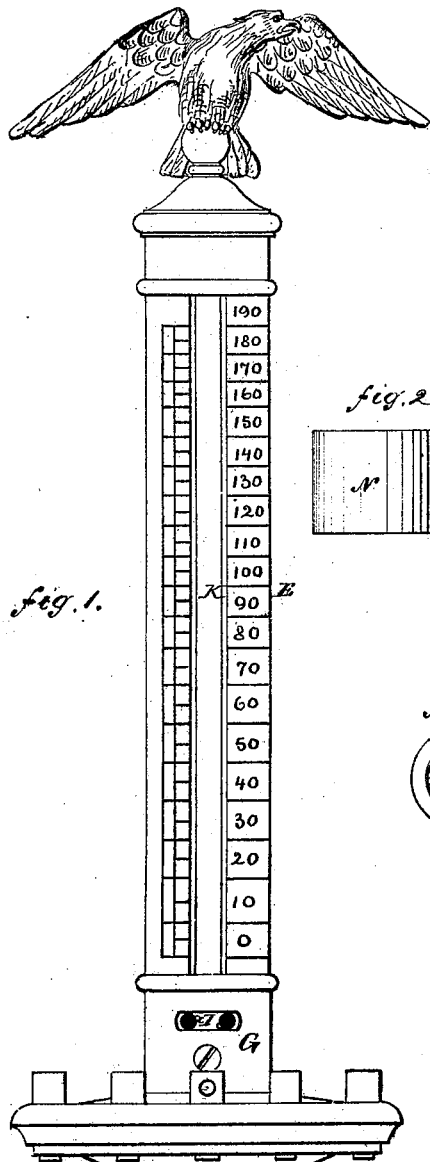
Figure 2:
Figure 3:
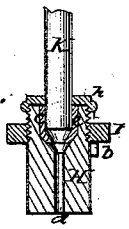
Figure 4:
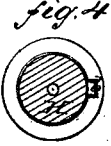
Figure 5:
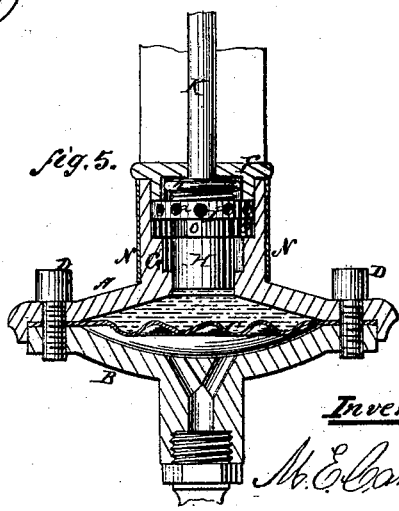

M. E. Campfield,
Pressure Regulator.
No. 102,464. Patented Apr. 26, 1870.

Witnesses:

Inventor:

United States Patent Office.

MATTHEW E. CAMPFIELD, OF NEWARK, NEW JERSEY, ASSIGNOR TO AMERICAN EAGLE STEAM-GAUGE COMPANY.

*Letters Patent No. 102,464, dated April 26, 1870.*

IMPROVEMENT IN THE ADJUSTMENT OF MERCURIAL PRESSURE-GAUGES.

The Schedule referred to in these Letters Patent and making part of the same.

I, MATTHEW E. CAMPFIELD, of the city of Newark and State of New Jersey, have invented certain Improvements in Regulators for Mercurial or Liquid-Gauges, of which the following is a specification.

Nature and Objects of the Invention.

This invention relates to a new method of adjusting mercury to the zero-point on the scale of a mercurial or liquid-gauge. The old way of adjustment has been by a set-screw in the cover or top plate of the gauge-chamber, which, by elevating or depressing it, correspondingly displaced the mercury in the glass tube.

Experience has demonstrated this method impracticable; in the first place, it is more difficult to construct the top plate by a lathe when the set-screw is employed; again, the mercury will be forced through the threads of the set-screw by an ordinary pressure, as will be readily perceived by the statement that the mercury can be forced, by a severe pressure, through the solid plates of the gauge-chamber; again, after filling the chamber, when the set-screw is replaced, a certain amount of air is confined therein, which prevents an accurate adjustment, until it has been in use for several days, as it is difficult to force the air through the mercury out of the chamber; and, while the air remains in, and during the existence of the vacuum afterward caused by its expulsion, the gauge, by repeated careful tests, has been found unreliable to the extent of from two to six pounds; and, finally, the gauge can be tampered with by the attendant without any fear of detection, and caused to vary ten or fifteen pounds, by only a few revolutions of the set-screw, greatly to the hazard of life and property.

The object of my invention, therefore, is to remedy these several defects by dispensing with the set-screw.

It consists of a plunger, provided, in its center, with a small tube, extending its whole length, working vertically in an extension of the top plate, in which rests the scale, and through which extension the chamber is filled, so that, whatever the temperature of the surrounding atmosphere may be, the zero-point may be readily and correctly indicated in elevating and lowering the plunger by a movable collar, in the manner of forming a tight-joint of rubber to prevent the escape of mercury, and also in preventing access to the gauge by the use of a locking-spring collar secured upon the extension of the top-plate.

Description of the Accompanying Drawings.

Figure I is a front elevation.
Figure II is a view of the locking-collar.
Figure III is a section of the plunger, showing the several parts used to secure a tight joint.
Figure IV is a horizontal section of the plunger, showing its connection with the fixed collar.

Figure V is a vertical section of Fig. I.

A and B represent, respectively, the top and collar plates of a mercurial or liquid-gauge chamber, divided horizontally by the corrugated, elastic metal partition C, and held together by the nuts D, the parts being nickel plated to prevent corrosion, in the ordinary manner.

E represents the scale, and K, the mercury-tube, which are made in the usual way.

G represents the extension of the top plate, provided in front with an orifice, through which to turn the movable collar. It is made high enough to inclose all the devices pertaining to the regulator, and into it is placed, and secured by set-screws, the upper part F of the gauge containing the glass column and indicating-scale.

H represents the plunger. It is made with a small tube, $d$, (see Fig. III,) extending lengthwise through its center, to permit the mercury to rise from the chamber up into the glass column K.

On its upper end, and for nearly half way down its length, there is cut upon it a screw-thread, onto which fits the movable collar I.

It is also provided with a spline, $b$, (see Fig. IV,) which fits into a corresponding groove in the fixed collar, which supports the plunger above the mercury in the chamber.

I represents the movable, and O, the fixed collar. The former has holes $a$, (see Fig. V,) upon its periphery, into which a nail or stick can be inserted through the orifice in the extension G, to turn it upon the screw-thread.

It will be seen in the drawings that the bottom of the upper part of the gauge F comes so near to the movable collar that it cannot be elevated in being turned, and, too, that the plunger is prevented from rotating by the spline $b$, which slides in the groove of the fixed collar O; therefore, it follows that upon rotation of the movable collar, the plunger will be compelled to move vertically in the extension G.

By reference to Fig. III, it will be seen that the plunger is recessed for nearly one-half its length, and that the end of the mercury-tube rests in this cavity.

To prevent the escape of mercury, I form an air-tight joint, by setting the end of the glass tube in a piece of rubber, $c$, which is made of less diameter, and a little longer than the recess, but which is expanded and made to fill the recess by placing over the rubber a cap, $h$, which is pressed down and screwed upon the plunger. Linen cloth is wound upon the lower part of the plunger, to form an air-tight joint between it and the extension, beneath the fixed collar. The bottom of the plunger resting upon, or nearly upon, the surface of the mercury, whatever air there is in the chamber exists in its upper part, and, consequently, will first be expelled through the tube by the downward course of the plunger, and, when it comes in contact with the mercury, its displacement by the descent of the plunger will cause accurate and almost instantaneous adjustment, there being no air or vacuum in the chamber.

The spring-metal collar N, (see Fig. II,) is placed around the extension between the top plate and the projection of the glass tube-case, shown in Fig. V, and locked, to prevent access to the regulator except by authority. Another way to accomplish this end is to secure a band of cloth around the extension with a wax seal.

It is obvious that my invention may be applied either to pressure or vacuum-gauges, or to any kind of mercurial or liquid indicator, wherever it is necessary to regulate the liquid to the zero-point of the indicating-scale.

It will thus be seen that the entire absence of wheels, cogs, gearing, or clock-work of any kind, in this gauge, renders it more durable, less liable to derangement, and more reliable than the metallic gauges now in general use.

What I claim as my invention, and desire to secure by Letters Patent, is—

The tubular plunger H, connected with the indicating-tube K of a mercurial pressure-gauge, and operated by the screw-nut I, for the purpose of adjusting accurately the height of the mercurial column in the said tube, substantially as described.

MATTHEW E. CAMPFIELD.

Witnesses:
JOSEPH G. HILL,
TREVONIAN HAIGHT.